(12) United States Patent
Tsunasaki et al.

(10) Patent No.: US 10,393,906 B2
(45) Date of Patent: Aug. 27, 2019

(54) METHOD AND DEVICE FOR DETECTING BURIED METAL USING SYNCHRONOUS DETECTION METHOD

(71) Applicant: FUJI TECOM INC., Tokyo (JP)

(72) Inventors: Masaru Tsunasaki, Osaka (JP); Kenshi Kubota, Tokyo (JP)

(73) Assignee: FUJI TECOM INC., Tokyo (JP)

( * ) Notice: Subject to any disclaimer, the term of this patent is extended or adjusted under 35 U.S.C. 154(b) by 77 days.

(21) Appl. No.: 15/563,332

(22) PCT Filed: Mar. 10, 2016

(86) PCT No.: PCT/JP2016/057566
§ 371 (c)(1),
(2) Date: Sep. 29, 2017

(87) PCT Pub. No.: WO2016/158289
PCT Pub. Date: Oct. 6, 2016

(65) Prior Publication Data
US 2018/0067224 A1 Mar. 8, 2018

(30) Foreign Application Priority Data
Mar. 31, 2015 (JP) .................................. 2015-071891

(51) Int. Cl.
*G01V 3/08* (2006.01)
*G01V 3/12* (2006.01)
(52) U.S. Cl.
CPC . *G01V 3/08* (2013.01); *G01V 3/12* (2013.01)
(58) Field of Classification Search
CPC ............... G01B 3/08; G01B 3/12; G01V 3/06
See application file for complete search history.

(56) References Cited

U.S. PATENT DOCUMENTS

2013/0200901 A1* 8/2013 Olsson ................... G01V 3/081
324/326

FOREIGN PATENT DOCUMENTS

JP 2001-116850 A 4/2001

* cited by examiner

*Primary Examiner* — Minh Q Phan
(74) *Attorney, Agent, or Firm* — Muncy, Geissler, Olds & Lowe, P.C.

(57) ABSTRACT

To provide a method and device for detecting buried metal, whereby it is possible to radio (wirelessly) transmit a synchronizing signal, and, when the frequency band of the transmission signal is restricted, to problem synchronous detection using a reference signal having a frequency equal to or greater than the frequency band. A method for detecting buried metal using synchronous detection method having a transmitting side device that transmits a transmitting signal (alternating current) to a buried metal for detection and transmits a synchronizing signal for synchronous detection, and a receiving side device for measuring the position and burial depth of the buried metal by detecting a magnetic field generated by the transmitting signal flowing in the buried metal with a magnetic sensor and processing amplitude and phase of the magnetic field, the method including: generating a standard signal of frequency f in the transmitting side device, and n dividing this standard signal to convert it to a transmitting signal of frequency f/n, transmitting this transmitting signal to the buried metal, m dividing the standard signal to convert it to a synchronizing signal of frequency f/m, transmitting this synchronizing signal from the transmitting side device by radio. Receiving the synchronizing signal by the receiving side device, m multiplying this received synchronizing signal to convert it to the standard signal. N dividing this converted standard signal to convert it to a reference signal of frequency f/n. Detecting a mag- (Continued)

netic field generated by the transmitting signal flowing in the buried metal and synchronously detecting with the reference signal.

4 Claims, 7 Drawing Sheets waveform by oscillator signal waveform by secondary induction waveform by oscillator signal waveform by secondary induction

METHOD AND DEVICE FOR DETECTING BURIED METAL USING SYNCHRONOUS DETECTION METHOD

FIELD OF THE INVENTION

This invention relates to method and device for detecting buried metal using synchronous detection method, in particular, it relates to method and device for detecting buried metal that transmits a synchronizing signal using radio and can synchronous detects using a reference signal of frequency above limited frequency band even if a frequency band of transmitting signal is limited.

BACKGROUND OF THE INVENTION

Usually, underground etc., many metal tubes, such as a gas pipe, a water pipe, and a drain pipe, or many cables, such as a telecommunication cable and an electric power cable, are buried.

In pillars and walls of a structure, such as a building, many buried metals are buried.

(Hereafter, except for a conventional example portion, these are named only described as a buried metal. Underground and structure are only described as underground.)

These buried metals are not buried in the shape of a straight line horizontally or vertically, since these buried metals are crooked horizontally or vertically or are branched, these buried metals cross intricately, and are constructed by congestion.

Thus, since many buried metals are constructed underground, for the accident prevention by construction of other companies, and the efficient control of maintenance of the buried metal of its company, the art for detecting the position and its burial depth of a buried metal without excavating is proposed.

As general prior art, there are an underground radar and an electromagnetic guidance pipeline detector so-called a pipe locator.

The detection principle of the underground radar which detects the metal tube currently buried in the ground is as follows.

An electric wave is emitted in the ground and the reflective wave from the metal tube currently buried in the ground is received, and signal processing of this received signal is carried out, it converts into a video signal, and a metal tube is detected.

Since an electric wave is reflected from the face where an electrical characteristic changes, underground structure such as a metal tube, a nonmetallic pipe, and a cave can also be detected by this method.

As a conventional example of the pipe locator by an electromagnetic induction method, there is an electromagnetic guidance pipeline detector (common name: a pipe locator) shown in non-patent document 1.

The detection principle of this pipe locator is as follows.

As shown in FIGS. 5(a)-(c), if an alternating current is passed through metal tubes 51 currently buried underground 50, the magnetic field (magnetic field H) of the shape of a concentric circle centering on this metal tube 51 will occur (refer to FIG. 5(b)).

This magnetic field H is detected with magnetic sensor 52a of the receiver which is on the ground, and this magnetic field H is calculated, and induction voltage is calculated.

The position of metal tube 51 can be detected from the position where this induction voltage becomes the maximum (refer to FIG. 5(c)).

The burial depth of metal tube 51 is calculated from this induction voltage.

Therefore, target for detection is limited to the metal tube or metal line which has conductivity.

Thus, the pipe locator is constituted by the transmitter 53 for sending current through metal tube 51 and the receiver provided with magnetic sensor 52a which detects magnetic field H generated when current flowed.

There are two kinds of methods of sending current through metal tube 51 from transmitter 53, direct method and an induction method.

As shown in FIG. 6, in the direct method, transmitter 53 is connected to metal tube 51 portion exposed on the ground, or transmitter 53 is connected to metal tubes 51 buried underground 50 via lead 54, and current is passed.

The leak current which flows into underground 50 from metal tube 51 is constituted so that it may feedback to transmitter 53 via earth 55.

As shown in FIG. 7, in the induction method, an electric wave is emitted towards underground 50 from transmitter 53a installed on the ground, and a magnetic field is generated.

Therefore, transmitter 53a and metal tube 51 of underground 50 becomes non-contact mutually, and the current (induced current) by electromagnetic induction flows into metal tube 51.

The magnetic field generated by the induced current receives with the ground receiver provided with magnetic sensor 52a, and is detecting a position and burial depth, etc. of metal tube 51 of underground from the amplitude of the magnetic field component of this magnetic field.

As shown in FIG. 6, in the direct method, since an alternating current can be passed only through metal tube 51 which is a target for detection, the value of magnetic field H to generate also becomes large, and detection accuracy is good compared with the induction method.

However, in the direct method, since transmitter 53 must be directly connected to metal tube 51, it is hard to apply to the metal tube which does not have an exposed portion on the ground.

In the above-mentioned electromagnetic induction type exploration equipment (pipe locator), the frequency of the alternating current (transmitting signal) for detection changes with the kinds and the burial conditions of a burial material.

For example, in the case of the cable, generally, the frequency of hundreds of Hz-several kHz is used, and, in the case of the gas pipe, the water pipe, etc., the frequency of tens of kHz-hundreds of kHz is used.

Moreover, if the transmitting signal for detection is emitted to the underground pipe which is the target for detection, although induced current flows into other pipes (pipe of a congestion state) buried under the neighborhood by the alternating current which flows into an underground pipe, the direction of induced current which flows into the underground pipe of target for detection and other pipes is opposite.

Therefore, in order to judge whether the underground pipe of target for detection is tracked correctly, it is effective to grasp the information about the direction of induced current.

For example, as shown in FIG. 8, when the gas pipe 60 and the water pipe 61 are buried in the state of congestion and both pipes are connected with hot-water supply machine 62, the direction of the alternating current for detection which is inputted from transmitter 63 and flows into a gas pipe and the direction of the alternating current for detection which flows into a water pipe is opposite direction mutually.

Therefore, if the direction of the alternating current which flows into gas pipe 60 and the direction of an alternating current which flows into water pipe 61 are known, it can judge which pipe is target for detection.

As a method of distinguishing the direction of current which flows into the target for detection, there are a method of using CD wave (Current Flow Direction) as a signal for detection, and a method of using synchronous detection.

As shown in non-patent document 2, as a method of using CD wave, there is continuous underground burial material detecting art by an electromagnetic induction method.

This art consists of Cable Explorer (brand name) 73 which can check the position of an underground burial material continuously by earth surface to un-excavating, and an oscillator 72 which oscillates a signal required for measurement.

As shown in FIG. 9 and FIG. 10, when measuring the position of the underground burial material 71 buried underground 70, the position information on underground burial material 71 is continuously acquirable by three dimensions by interlocking underground burial material detecting device 75 which measures the burial depth of underground burial material 71, and RTK-GPS74 which can acquire position information.

In underground burial material detecting device 75, oscillator 72 is directly connected to underground burial material 71, the magnetic field generated by sending current through underground burial material 71 is detected on the ground, and the burial depth of underground burial material 71 is measured.

In RTK-GPS (Real Time Kinematic Global Positioning System) 74, position information is acquired using GPS74a, GPS74b, and GPS74c . . . which is highly precise and can acquire the plane position information (latitude, longitude) of underground burial material 71.

Cable Explorer 73 is constituted by the underground burial material exploration equipment 75, GPS-RKT74 which obtains the position information of truck, the optical gyroscope 76 which calculates the move direction of the truck, the odometer 77 which calculates the moving distance of the truck and personal computer ((hereafter PC) 78 which stores and processes the information that each equipment obtains.

These devices are laid on the cart which has a move function.

In addition, 79 is an indicator which shows a measurement result etc.

The underground burial material detecting device 75 receives the magnetic field generated by the alternating current which flows into the underground burial material 71, and is calculating position information by this magnetic field strength.

Plane position information is shown from the cart center by "+" or "−" in a horizontal direction toward the moving direction of underground burial material 71.

As for depth information, the distance from the earth surface to the center of the underground burial material 71 is shown.

On the other hand, as a method of using synchronous detection, there is an one-point method as indicated to patent documents 1.

As shown in FIG. 11 of the patent documents 1, by using the locator which has an oscillator 80, a receiver 81 and the ground means 82, by an one-point method, the exposed portion of underground pipes 83 which have conductivity and ground means 82 are connected to the output of oscillator 80 with an underground pipe which has conductivity or a locating wire etc., and the ground is made into a feedback line and the closed circuit which has a distribution constant circuit in part is constituted.

By scanning or operating it, detector 84 connected to receiver 81 detects the magnetic field guided by the current which flows into underground pipe 83, and is detecting underground pipe 83.

By this method, a phase detection means 86 to detect a phase is further prepared in the receiver 81 which has a detector 84 and the display means 85, and receiving information is obtained by this phase detection means 86, and position P1 of corresponding to the ground of underground pipe 83 and burial depth D is calculating based on this receiving information.

PRIOR ART DOCUMENTS

Non-Patent Document

[Non-Patent Document 1]
Domestic magazine "Piping, device and plant technology", Vol. 31, No. 6, page. 4-6, title "present condition of burial inquiry technology" NAGASHIMA Shingo work.
[Non-Patent Document 2]
Domestic magazine Technical description Technology of the ground to inquiry investigation in which it does not excavate [Continuous underground burial material inquiry technology by an electromagnetic induction method "cable Explorer"] No-Dig Today No. 58(2007, 1) page. 1-6.

Patent Documents

[Patent Documents 1]
JP, 2001-116850, A

DESCRIPTION OF THE INVENTION

Problem(s) to be Solved by the Invention

The invention mentioned in non-patent document 2 uses CD wave as an alternating current (transmitting signal) passed in order to detect.

However, since the underground pipe which is a target for detection is a kind of transmission line, it depends for the damping characteristic and phase characteristics of a signal on frequency.

Therefore, this method (CD wave method) can be used in the low frequency band which frequency is low.

However, since the alternating signal which has two different frequency will be used, if frequency becomes high, as shown in FIGS. 12 and 13, both alternating signals interfere and waveform distortion arises.

Therefore, there was a problem that the direction of current of the alternating signal which flows through the underground pipe of target for detection was not identifiable.

Thus, since the frequency band which can be used by CD wave method is limited to the low frequency band up to about several KHz, when the laying length of the underground pipe of target for detection is long and detects telecommunication cable etc. of the high conductivity, it does not become a big problem.

However, when the laying length of the underground pipe of target for detection was comparatively short, or a gas pipe or a water pipe of the low conductivity, there was a problem that detection performance fell remarkably.

Namely, the metal tube currently buried is premised on being unlimited length and being a straight line-form object in the invention shown in nonpatent document 2.

Therefore, when the buried metal tube is limited length and it has a part for a curved part, and a branch portion, or in the case where the buried metal tube and other buried metal tubes etc. crossed and congestion in underground etc., under the influence by other buried metal tubes, the 2nd induction magnetic field and the 3rd induction magnetic field occurred, these caused an error of measurement, and there was a problem that the position of the buried metal tube which is target for detection could not be measured correctly.

Therefore, at present, the frequency band is used only in 500 Hz-1500 Hz.

Therefore, although there is a problem that the frequency band which can be used is low, since target for detection is a telecommunication cable, the electric conductivity is high.

Moreover, in a telecommunication cable, packing which disturbs the flow of alternating current in a joint portion is not used like a water pipe or a gas pipe.

Therefore, as frequency of the alternating current sent through a telecommunication cable, a low frequency band can also detect target for detection enough.

However, if the frequency of an alternating current becomes high, the phase of the alternating current will change.

Therefore, the problem that a telecommunication cable cannot be detected is also generated.

On the other hand, the invention of patent documents 1 is the method which used the synchronous detection method, and is transmitted with the cable as a transmission method of the reference signal in a synchronous detection method.

Therefore, different from the method of depending on CD wave, there is an effect that there is no limitation in the frequency of the reference signal transmitted.

However, since the distance between transmitting and receiving by the pipe locator amounts to several 100 m-1 km, moreover, the receiver side must move continuously.

Therefore, it is not practical to construct the cable for transmission of a reference signal and to transmit the alternating signal for detection with a cable between transmitting and receiving.

Patent documents 1 have the description "cable or radio", as a transmission method of the reference signal by a synchronous detection method.

However, although one description "wired or wireless" is indicated, there is no concrete description into a drawing (refer to FIG. 1 of patent documents 1).

However, the case where the reference signal in the synchronous detection method described to patent documents 1 is transmitted on radio is considered.

Since there is limitation by Wireless Telegraph Law when the reference signal is transmitted on radio, the frequency band which can be transmitted is usually up to a voice frequency band.

In the case where narrow frequency band FM radio is used, the frequency bands which can be transmitted are 300 Hz-3000 Hz.

Therefore, the frequency band which can be used is limited.

Therefore, like the method of depending on the above-mentioned CD wave, the construction length of the underground pipe of target for detection is comparatively short, and further, like a gas pipe or a water pipe, when electric conductivity, such as a buried metal pipe of target for detection, is low, the problem occurs that detection efficiency falls remarkably.

Thus, since the frequency band which can be used for transmission of the reference signal by radio was limited to 300 Hz-3000 Hz as mentioned above, it had the problem that a maximum of the frequency of the transmitting signal for detection was limited to 3 kHz.

However, as described above, in this frequency band (300 Hz-3000 Hz), the construction length of the underground pipe of target for detection is comparatively short, and like a gas pipe or a water pipe, when electric conductivity, such as a buried metal pipe of target for detection, is low, the problem that detection efficiency falls remarkably occurs.

Especially, when detecting a metal tube, the transmitting signal for detection will be flowed via the packing inserted in order to give flexibility to the joint of an underground pipe.

Therefore, when the frequency of a transmitting signal was low, the transmitting signal was isolated with packing, current was not able to flows into the underground pipe, and an underground pipe was not able to be detected.

However, when the frequency of a transmitting signal is high, current (transmitting signal) flows into an underground pipe by electrostatic induction.

Therefore, in order to detect the underground pipe of various kinds broadly, as a transmitting signal for detection, there were many requests of use of the high frequency band of several 10 kHz-several 100 kHz.

This invention was made in order to solve the above-mentioned problem.

This invention is the pipe locator which used the synchronous detection method, and in the synchronous detection method of this invention, a reference signal is transmitted on radio and the reference signal can use the frequency more than the frequency band which can be used by radio communications.

Means for Solving the Problem

A method for detecting buried metal using synchronous detection method having a transmitting side device that transmits a transmitting signal (alternating current) to a buried metal for detection and transmits a synchronizing signal for synchronous detection, and a receiving side device for measuring the position and burial depth of the buried metal by detecting a magnetic field generated by the transmitting signal flowing in the buried metal with a magnetic sensor and processing amplitude and phase of said magnetic field, the method invention of Claim 1 comprising:

generating a standard signal of frequency f in the transmitting side device, n dividing this standard signal to convert it to a transmitting signal of frequency f/n, transmitting this transmitting signal to the buried metal, m dividing the standard signal to convert it to a synchronizing signal of frequency f/m, transmitting this synchronizing signal from the transmitting side device by radio, receiving the synchronizing signal by the receiving side device, m multiplying this received synchronizing signal to convert it to the standard signal, n dividing this converted standard signal to convert it to a reference signal of frequency f/n, and detecting a magnetic field generated by the transmitting signal flowing in the buried metal and synchronously detecting with the reference signal.

A device for detecting buried metal using synchronous detection method comprising a transmitting side device that transmits a transmitting signal (alternating current) to a buried metal for detection, and a receiving side device for measuring the position and burial depth of the buried metal by detecting a magnetic field generated by the transmitting signal flowing in the buried metal with a magnetic sensor and processing amplitude and phase of the magnetic field, the device invention of Claim 2 comprising:

the transmitting side device including a standard oscillator for generating a standard signal frequency f/n, a 1st divider for n dividing the standard signal to convert it to a transmitting signal of frequency f/n, a 2nd divider for m dividing the standard signal to convert it to a synchronizing signal of frequency f/m, a 1st transmitter for transmitting the transmitting signal converted by the 1st divider to the buried metal, a 2nd transmitter for transmitting the synchronizing signal converted by the 2nd divider by radio;

and the receiving side device including a 2nd receiver for receiving the synchronizing signal, a multiplier for m multiplying this synchronizing signal to convert it to the standard signal, a 3rd divider for n dividing this standard signal of frequency f to convert it to a reference signal of frequency f/n, a magnetic sensor for detecting a magnetic field generated by the transmitting signal flowing in the buried metal and a device for synchronously detecting a signal detected by this magnetic sensor by the reference signal.

A method for detecting buried metal using synchronous detection method having a transmitting side device that transmits a transmitting signal (alternating current) to a buried metal for detection and transmits a synchronizing signal for synchronous detection, and a receiving side device for measuring the position and burial depth of said buried metal by detecting a magnetic field generated by said transmitting signal flowing in said buried metal with a magnetic sensor and processing amplitude and phase of said magnetic field, the method invention of Claim 3 comprising:

generating a standard signal of frequency f in the receiving side device, n dividing this standard signal to convert it to a reference signal of frequency f/n, m dividing the standard signal to convert it to a synchronizing signal of frequency f/m, and transmitting this synchronizing signal from the receiving side device by radio, receiving the synchronizing signal by the transmitting side device, m multiplying this received synchronizing signal to convert it to the standard signal, n dividing this standard signal to convert it to a transmitting signal of frequency f/n, and transmitting this transmitting signal to the buried metal, and detecting a magnetic field generated by the transmitting signal flowing in the buried metal and synchronously detecting with the reference signal.

A device for detecting buried metal using synchronous detection method comprising a transmitting side device that transmits a transmitting signal (alternating current) to a buried metal for detection, and a receiving side device for measuring the position and burial depth of the buried metal by detecting a magnetic field generated by the transmitting signal flowing in the buried metal with a magnetic sensor and processing amplitude and phase of the magnetic field, the device invention of claim 4 comprising:

the receiving side device including a standard oscillator for generating a standard signal frequency f, a 2nd divider for m dividing this standard signal to convert it to a synchronizing signal of frequency f/m, a 2nd transmitter for transmitting this synchronizing signal by radio, a 1st divider for n dividing said standard signal to convert it to a reference signal of frequency f/n, a magnetic sensor for detecting a magnetic field generated by the transmitting signal flowing in the buried metal and a device for synchronously detecting a signal detected by this magnetic sensor by the reference signal; and the transmitting side device including a 2nd receiver for receiving the synchronizing signal, a multiplier for m multiplying this synchronizing signal to convert it to the standard signal, a 3rd divider for n dividing this standard signal of frequency f to convert it to a reference signal of frequency f/n and a 1st transmitter for transmitting the transmitting signal converted by the 1st divider to the buried metal.

Effect of the Invention

Since invention concerning claim 1 and claim 2 was constituted as mentioned above, since the frequency of the transmitting signal passed to the buried metal of target for detection can be used by a high frequency band, detection distance can be lengthened.

Since the reference signal for synchronous detection is transmitted on radio, the cable which connects a transmitting point and a receiving point can become unnecessary, and a receiving point can be moved easily.

In the technical field of this invention, although the frequency band of radio transmission has limitation, the detecting method and its device can be offered which can carry out synchronous detection using the reference signal of the frequency more than this limitation band.

The construction length of the buried metal of target for detection is comparatively short, and like a gas pipe or a water pipe, when the electric conductivity of a buried metal is low, detection efficiency does not fall remarkably like a conventional example.

The transmitting signal (alternating current for detection) which flows through a buried metal uses the standard signal (f) of frequency higher than the frequency of the conventional transmitting signal, since the frequency f is carried out n divided or m divided, if divided ratio f/n or divided ratio f/m is controlled, a damping characteristic and the phase characteristic can be set as the optimal value.

Since invention concerning Claim 3 and Claim 4 was constituted as mentioned above, there is the same effect as above-mentioned Claim 1 and Claim 3.

Furthermore, since the standard oscillator has been arranged to the receiving side device, the load of the transmitting side device is reducible.

THE FORM FOR INVENTING

A method for detecting buried metal using synchronous detection method having a transmitting side device that transmits a transmitting signal (alternating current) to a buried metal for detection and transmits a synchronizing signal for synchronous detection, and a receiving side device for measuring the position and burial depth of the buried metal by detecting a magnetic field generated by the transmitting signal flowing in the buried metal with a magnetic sensor and processing amplitude and phase of said magnetic field, the method comprising:

generating a standard signal of frequency f in the transmitting side device, n dividing this standard signal to convert it to a transmitting signal of frequency f/n, transmitting this transmitting signal to the buried metal, m dividing the standard signal to convert it to a synchronizing signal of frequency f/m, transmitting this synchronizing signal from the transmitting side device by radio, receiving the synchronizing signal by the receiving side device, m multiplying this received synchronizing signal to convert it to the standard signal, n dividing this converted standard signal to convert it to a reference signal of frequency f/n, and detecting a magnetic field generated by the transmitting signal flowing in the buried metal and synchronously detecting with the reference signal.

Embodiment 1

Figure 1:
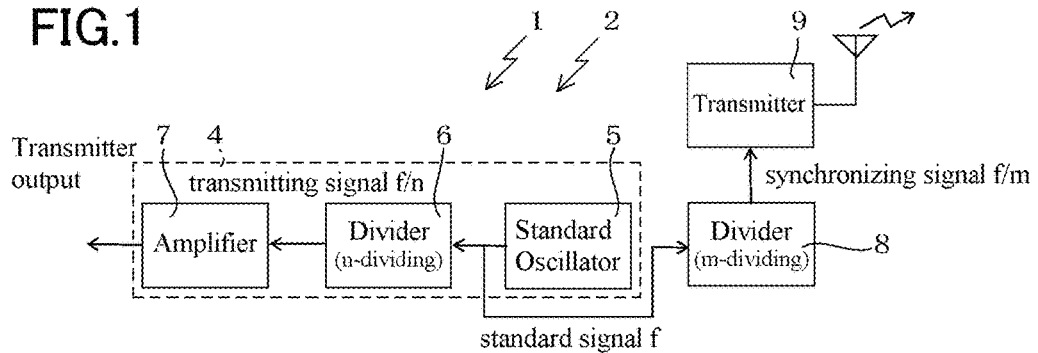
FIG. 1 shows the embodiment of this invention and is a block diagram of the transmitting side device 2 of detecting device 1 of the buried metal by this invention.
Figure 2:
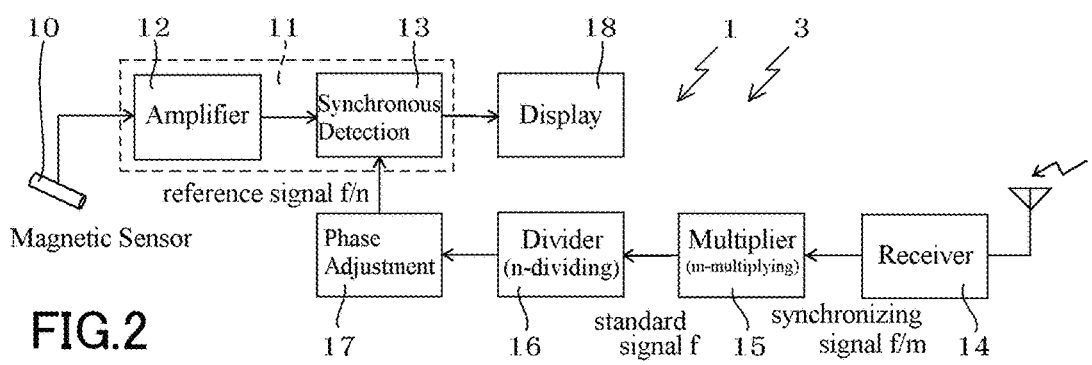
FIG. 2 shows the embodiment of this invention and is a block diagram of the receiving side device 3 of detecting device 1 of the buried metal by this invention.

The 1st embodiment of this invention is explained in detail based on FIGS. 1-2.

FIGS. 1-2 show the 1st embodiment of this invention, FIG. 1 is a block diagram of the transmitting side device 2 of the detecting device 1 of the buried metal by this invention, and FIG. 2 is a block diagram of the receiving side device 3 of the detecting device 1 of the buried metal.

In this embodiment 1, the standard oscillator 5 mentioned later is an embodiment in the case of being a constituent factor of transmitting side device 2.

As shown in FIGS. 1-2, the detecting device 1 of the buried metal is constituted by the transmitting side device 2 and the receiving side device 3.

Transmitting side device 2 passes a transmitting signal (alternating current for detection) on metal underground-pipe ways currently buried in the ground, such as a water pipe currently buried in the ground, a gas pipe, a drain pipe, a telecommunication cable, and an electric power cable (it is hereafter described as a buried metal.).

Receiving side device 3 has the magnetic sensor 10 which detects the magnetic field induced to a buried metal by this transmitting side device 2.

As shown in FIG. 1, the transmitting side device 2 is constituted by the 1st transmitter 4, the 2nd divider 8, and the 2nd transmitter 9.

The 1st transmitter 4 is constituted by the standard oscillator 5, the 1st divider 6, and the 1st amplifier 7.

As shown in FIG. 2, the receiving side device 3 is constituted by the 2nd receiver 14, the multiplier 15, the 3rd divider 16, the phase adjustment machine 17, the display 18, the magnetic sensor 10, and the 1st receiver 11.

The 1st receiver 11 is constituted by the 2nd amplifier 12 and the detector 13.

In the transmitting side device 2, while passing a transmitting signal (alternating current for detection) to a buried metal, a synchronizing signal is transmitted to the receiving side device 3.

As for the transmitting signal (alternating current for detection) passed to a buried metal, n divides carries out the standard signal (it is hereafter described as a standard signal (f)) of the frequency f mentioned later, and it is transmitted to a buried metal by the 1st transmitter 4 as a transmitting signal (it is hereafter described as a transmitting signal (f/n)) of frequency f/n.

The synchronizing signal (it is hereafter described as a synchronizing signal (f/m) of frequency f/m which m divided carried out the standard signal (f) is transmitted to receiving side device 3 by the 2nd transmitter 9 as a synchronizing signal for synchronous detection.

As a synchronizing signal for synchronous detection, the synchronizing signal (it is hereafter described as a synchronizing signal (f/m)) of frequency f/m as for which m divides carried out the standard signal (f) is constituted so that it may transmit to the receiving side device 3 by the 2nd transmitter 9.

In the receiving side device 3, the 2nd receiver 14 receives the synchronizing signal (f/m) transmitted by radio from the 2nd transmitter 9, the magnetic sensor 10 detects the magnetic field induced by the transmitting signal (f/n) transmitted to the buried metal from the 1st transmitter 4.

Subsequently, the position of a buried metal and the direction of current of the transmitting signal transmitted to the buried metal can be detected by carrying out synchronous detection with the 1st receiver 11.

Standard oscillator 5 generates the transmitting signal (f/n) transmitted to a buried metal, and the standard signal (f) which is used as the standard of the synchronizing signal (f/m) transmitted to receiving side device 3.

In this embodiment, the crystal oscillator is used for the standard oscillator 5.

In the case of direct method (i.e., when a part of buried metal is exposed to the ground), the 1st transmitter 4 is directly connected to this exposed buried metal portion, and it has a means for transmitting (a probe etc., not shown) a transmitting signal (f/n).

Moreover, in the case of the induction method (i.e., when the buried metal is not exposed to the ground at all), the 1st transmitter 4 makes an underground buried metal induce an exchange magnetic field, and it has a means for passing a transmitting signal (alternating current for detection) by non-contact by electromagnetic induction.

In this embodiment, the multiplier 15 is using the synchronous oscillator which used PLL (Phase Lock Loop).

By constituting multiplier 15 in this way, it is possible to take the large number of multiple (m).

Multiplier 15 may connect an analog multiplier to multi stage simply.

In this embodiment, the 1st divider 6, the 2nd divider 8, and the 3rd divider 16 are using the divider which used DDS (Direct Digital Synthesizer).

Like this, by constituting the divider (the 1st divider 6, the 2nd divider 8 and the 3rd divider 16), it is possible to increase the flexibility of the frequency which can be used.

The divider of the form which combined the flip flop is sufficient as the 1st divider 6, the 2nd divider 8, and the 3rd divider 16.

The 2nd transmitter 9 has a transmitting antenna and the 2nd receiver 14 has a receiving antenna.

The synchronizing signal (f/m) is transmitted to the 2nd receiver 14 on radio from the 2nd transmitter 9.

The magnetic sensor 10 is constituted by the coil which detects the magnetic field which induced by the transmitting signal (alternating signal for detection) transmitted to the buried metal, and the I/V converter which converts the induced electromotive force induced by this detected magnetic field into voltage from current, and the band path filter which an unnecessary frequency component is removed.

Next, function and operation in the case of detecting a buried metal using the detecting device 1 of a buried metal is explained in detail based on FIGS. 1-2.

In FIG. 1, the transmitting signal transmitted to a buried metal and the standard signal (f) used as the standard of the synchronizing signal for synchronous detection are generated by the standard oscillator 5.

This standard signal (f) is carried out n divides by the 1st divider 6, subsequently, it is converted into the transmitting signal (f/n) for transmitting to a buried metal, furthermore, m divides is carried out by the 2nd divider 8, and it is converted into the synchronizing signal (f/m) transmitted to the receiving side device 3.

The synchronizing signal (f/m) is transmitted to the receiving side device 3 on radio by the 2nd transmitter 9.

As the conventional example also indicated, the frequency band which can transmit on radio needs to be set in general to 300 [Hz]-3 [kHz], when transmitting by FM radio of the usual narrow band.

Therefore, frequency f/m of a synchronizing signal (f/m) needs to select the standard signal (f) generated with the standard oscillator 5, and the dividing ratio m of the 2nd divider 8 so that the above-mentioned limitation may be satisfied.

The synchronizing signal (f/m) transmitted to this receiving side device 3 is received by the 2nd receiver 14, and this received signal is carried out m multiplied by the multiplier 15, and is converted into a standard signal (f).

This standard signal (f) is carried out n divides by the 3rd divider 16, and phase adjustment is carried out with the phase adjustment machine 17, and it is converted into the reference signal (it is hereafter described as a reference signal (f/n)) of frequency f/n.

In addition, as a reason for performing phase adjustment, in synchronous detection, it is necessary to coincide the phase of the signal detected with the magnetic sensor 10 inputted into the detector 13, and the phase of the reference signal (f/n).

In an induction method and direct method, phases of the current of the transmitting signal transmitted to the buried metal is different 90 degrees.

Since a phase changes by the impedance of a buried metal, when transmitting a synchronizing signal (f/m) on radio, the delay of a phase and progress arise.

On the other hand, after the transmitting signal (f/n) amplifies the output of a transmitting signal (f/n) by the 1st amplifier 7, it is transmitted to a buried metal by the direct method or the induction method.

The magnetic field guided to a buried metal is detected with the magnetic sensor 10 by the transmitting signal (f/n) transmitted to this buried metal.

Although not illustrated in FIG. 1, after the induced electromotive force induced by the detector coil of magnetic sensor 10 by the magnetic field detected with this magnetic sensor 10 was converted into voltage by I/V conversion, an unnecessary frequency component is removed by the band path filter.

Subsequently, after amplifying this signal (voltage) by the 2nd amplifier 12, it is inputted into detector 13 and synchronous detection is carried out in this detector 13 using a reference signal (f/n).

The amplitude and the phase of a magnetic field which were induced by the transmitting signal (alternating current for detection) transmitted to the buried metal by this synchronous detection are calculated by this synchronous detection.

Based on these amplitude and phases of a magnetic field for which it calculated, the magnetic field distribution, the burial depth of a buried metal, and the direction of current of the transmitting signal (f/n) transmitted to the buried metal is calculated, and it is outputted to display 18.

The position and burial depth of a buried metal are detected based on magnetic field distribution of the magnetic field guided from the buried metal, the depth of a buried metal, and direction of current of the transmitting signal (f/n) transmitted to the buried metal etc.

The object (buried metal) detected by receiving side device 3 is able to distinguish whether it is a buried metal of target for detection, or it is the buried metal which is not target for detection and which carried out congestion.

As described above, the synchronizing signal (f/m) transmitted on radio has limitation that the frequency must be set in general to 300 [Hz]-3 [kHz], but there is no such limitation in the transmitting signal (f/n) transmitted to a buried metal.

Therefore, when the transmitting signal (f/n) of the frequency beyond limitation of this frequency band needs to be transmitted to a buried metal, if it sets up with (the dividing ratio n of the 1st divider 6 and the 3rd divider 16)<(the dividing ratio m of the 2nd divider 8), it is possible to acquire the reference signal (f/n) of the frequency more than the synchronizing signal (f/m) which has limitation in a frequency band.

Furthermore, if the dividing ratio n of the 1st divider 6 and the 3rd divider 16 is changed, it is possible to change easily the frequency of the transmitting signal (f/n) used for detection of a buried metal.

Embodiment 2

Figure 3:
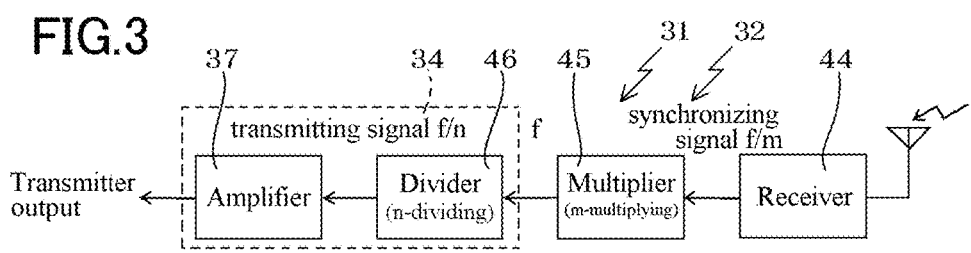
FIG. 3 shows the embodiment of this invention and is a block diagram of the transmitting side device 32 of the detecting device 31 of the buried metal by this invention.
Figure 4:
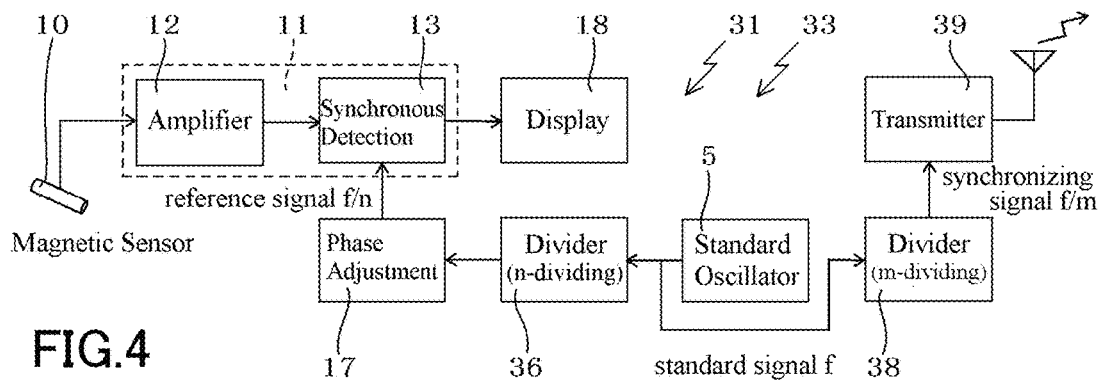
FIG. 4 shows the embodiment of this invention and is a block diagram of the receiving side device 33 of the detecting device 31 of the buried metal by this invention.
Figure 5:
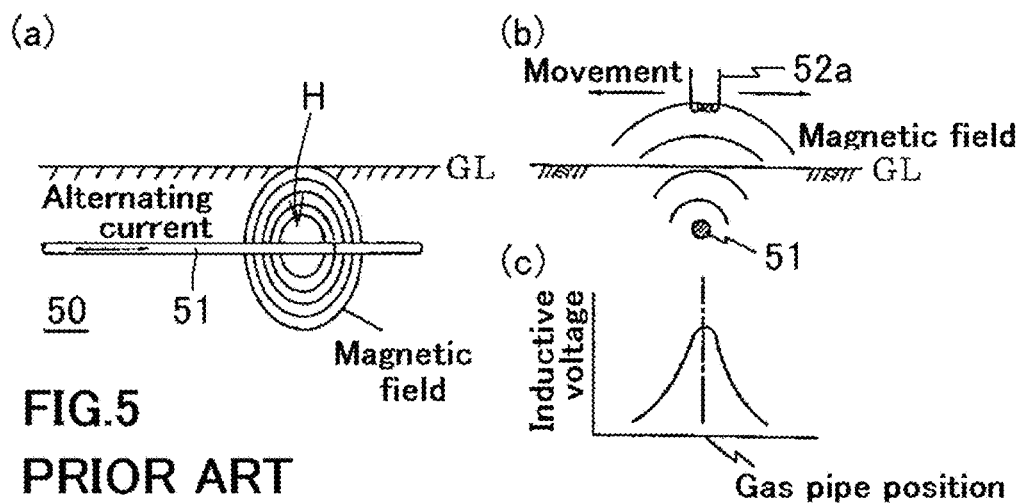
FIG. 5 shows conventional example and is a mimetic diagram showing the detection principle of an electromagnetic guidance pipeline detector (pipe locator).
Figure 6:
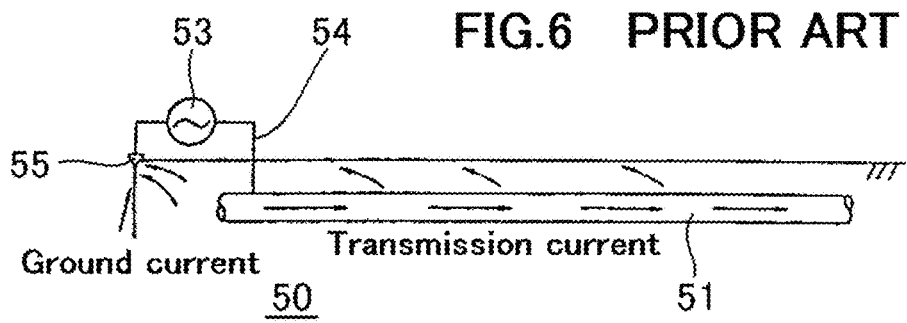
FIG. 6 shows conventional example and is a mimetic diagram showing how to transmit the current of the alternating signal by the direct method of an electromagnetic guidance pipeline detector (pipe locator).
Figure 7:
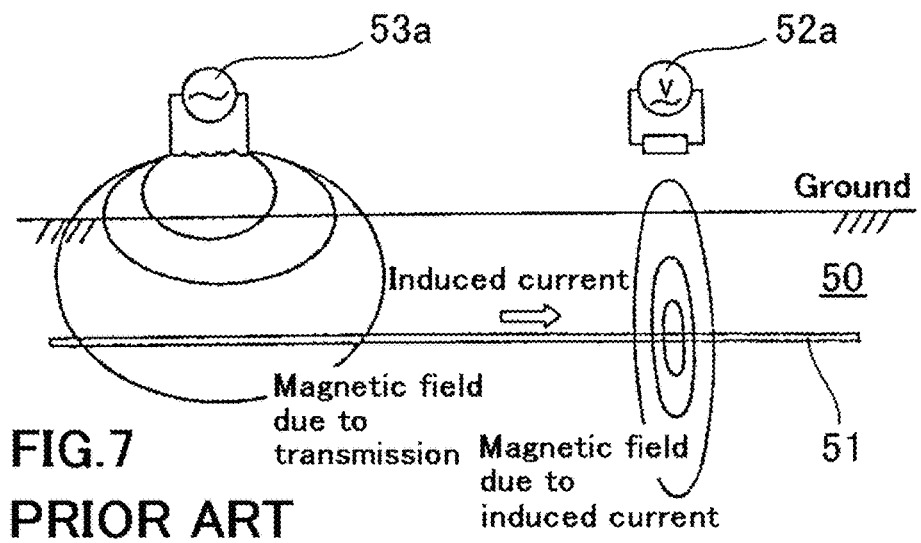
FIG. 7 shows a conventional example and is a mimetic diagram showing how to transmit the current of the alternating signal by the induction method of an electromagnetic guidance pipeline detector (pipe locator).
Figure 8:
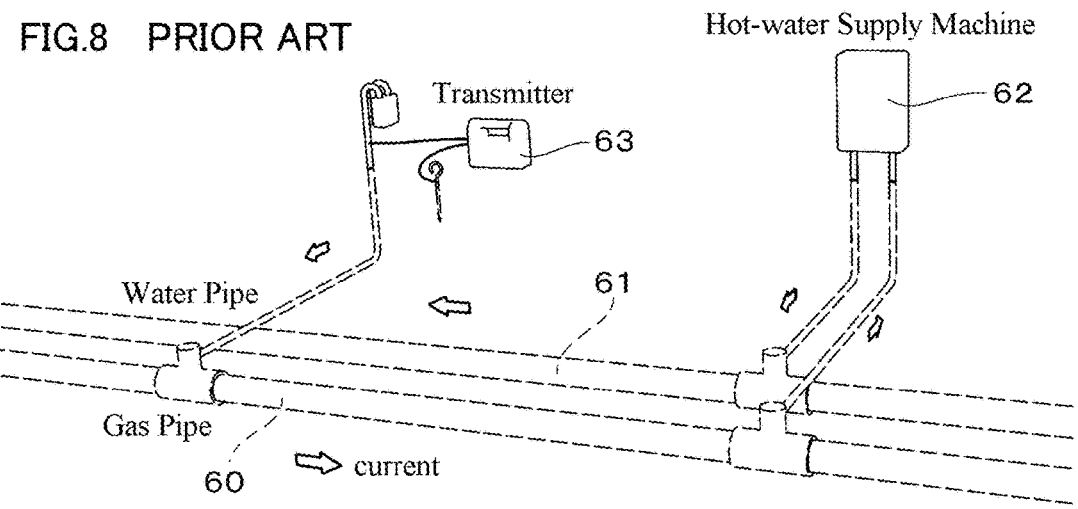
FIG. 8 shows a conventional example and is a diagram for explaining the direction of current which flows into the underground pipe which is buried underground.
Figure 9:
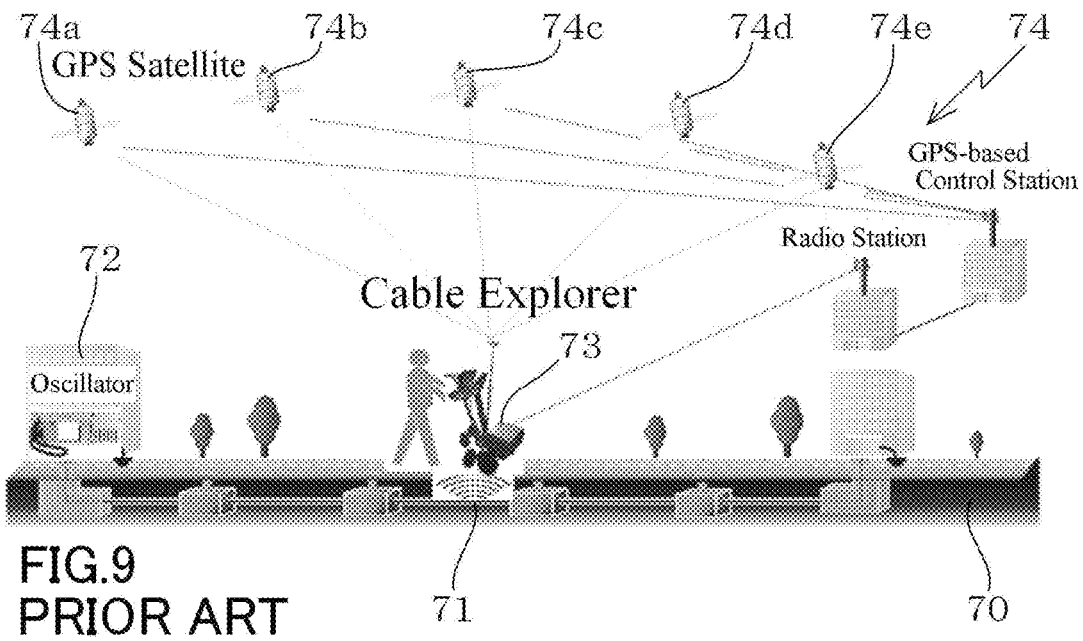
FIG. 9 shows a conventional example and is a system configuration diagram of Cable Explorer.
Figure 10:
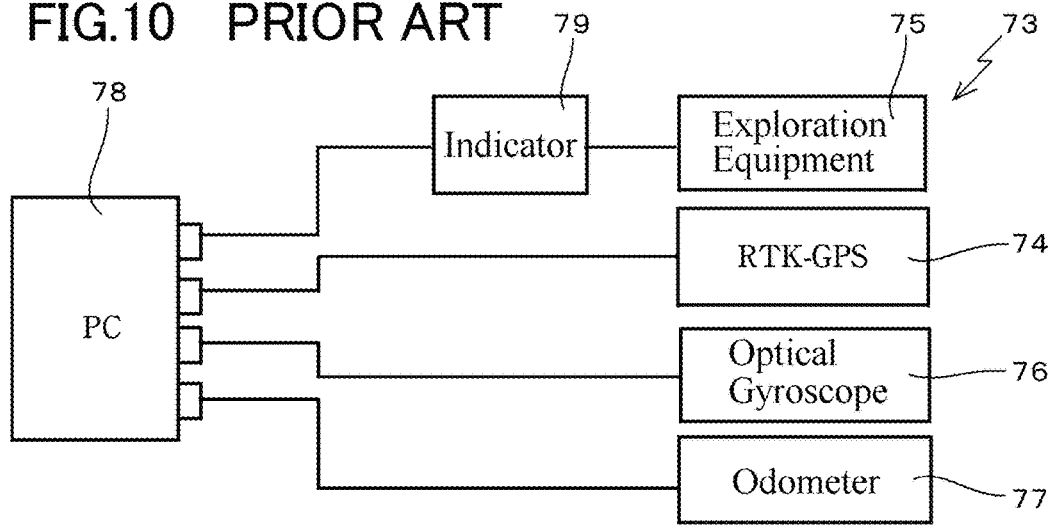
FIG. 10 shows a conventional example and is a system configuration diagram of the underground burial material exploration equipment which is mounted in Cable Explorer.
Figure 11:
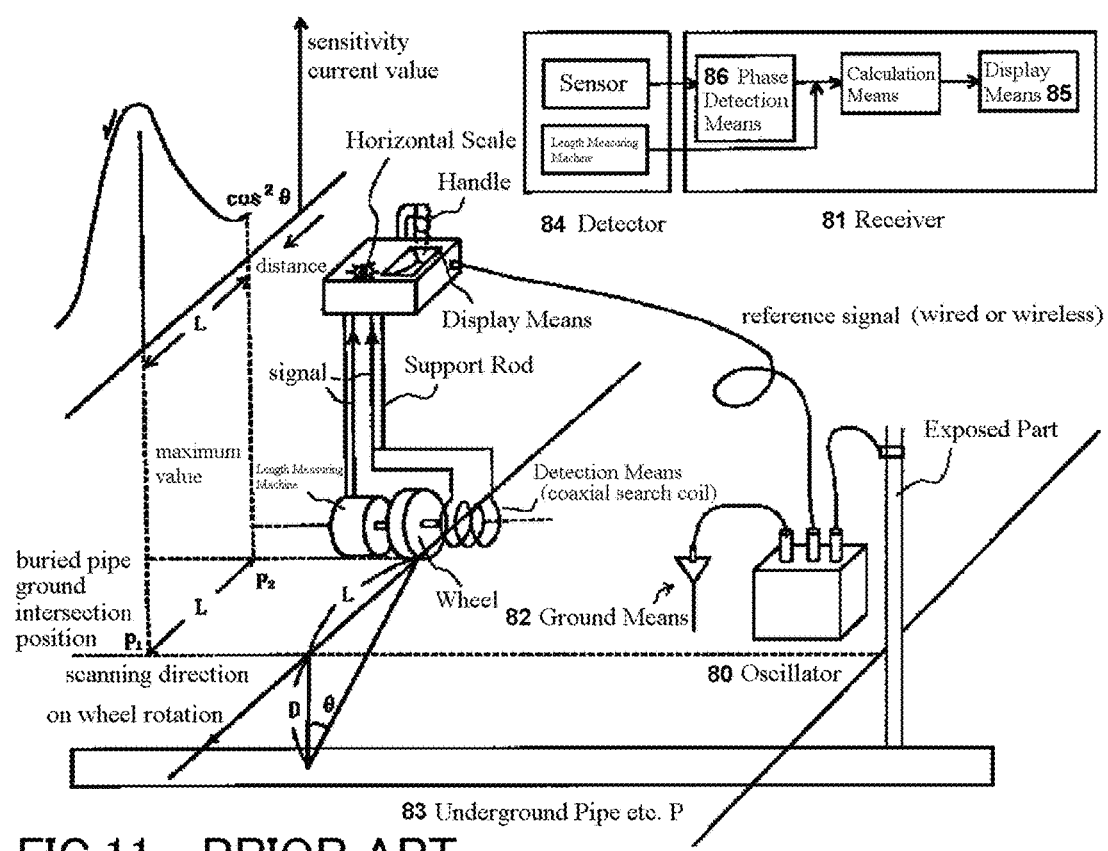
FIG. 11 shows a conventional example and is an explanatory diagram which showing an example of the detecting device used when e using the detecting method of an underground pipe.
Figure 12:
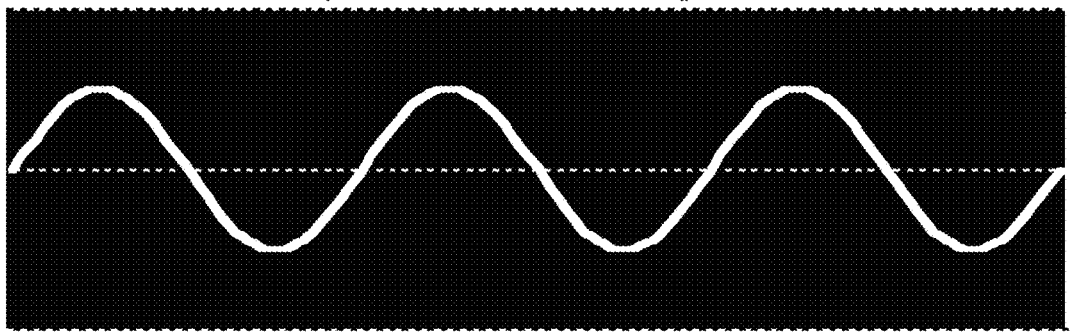
FIG. 12 shows a conventional example and is a wave form chart which transmitting signal by CD wave, and a wave form chart by secondary guidance.
Figure 12:
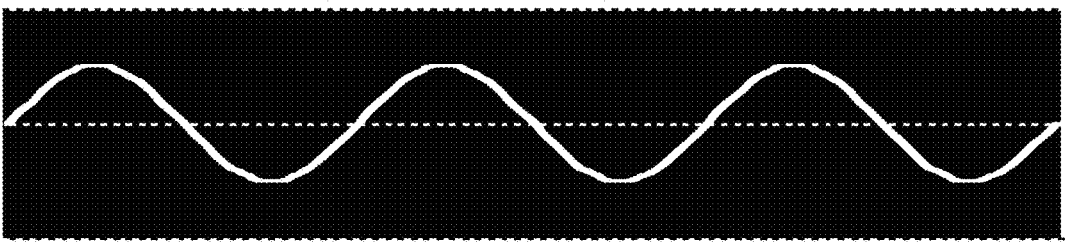
Figure 13:
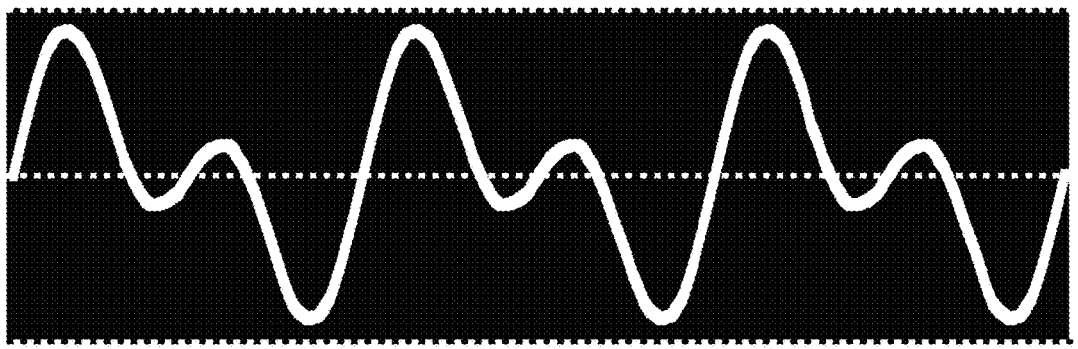
FIG. 13 shows a conventional example, is a transmitting signal by CD wave, and a wave form chart by secondary guidance, and is a wave form chart when waveform distortion arises.
Figure 13:
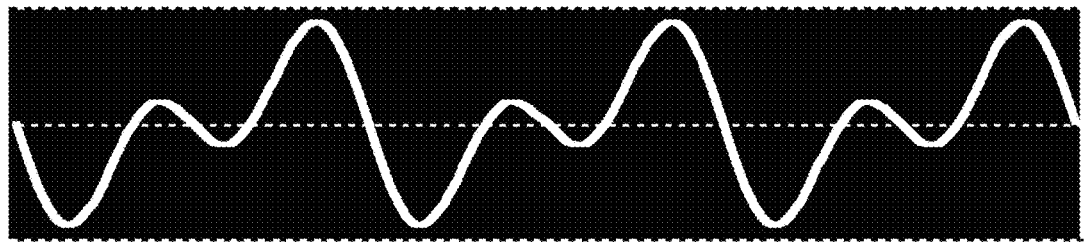

The 2nd embodiment of this invention is explained in detail based on FIGS. 3-4.

FIGS. 3-4 show the 2nd embodiment of this invention, FIG. 3 is a block diagram of the transmitting side device 32 of the detecting device 31 of a buried metal by this invention, and FIG. 4 is a block diagram of the receiving side device 33 of the detecting device 31 of a buried metal.

In this embodiment 2, it is an embodiment when standard oscillator 5 serves as a constituent factor of receiving side device 33.

The explanation is omitted about the same portion as the 1st embodiment, using the same name and the same number.

As shown in FIGS. 3-4, like embodiment 1, the detecting device 31 of a buried metal is constituted by the transmitting side device 32 for passing a transmitting signal (alternating current for detection) to a buried metal, and the receiving side device 33 which has magnetic sensor 10 which detects the magnetic field induced to a buried metal by this transmitting side device 32.

As shown in FIG. 3, the transmitting side device 32 is constituted by the 2nd receiver 44, the multiplier 45, and the 1st transmitter 34.

The 1st transmitter 34 is constituted by the 3rd divider 46 and the 1st amplifier 37.

As shown in FIG. 4, the receiving side device 33 is constituted by the standard oscillator 5, the 2nd divider 38, the 2nd transmitter 39, the 1st divider 36, the phase adjustment machine 17, the indicator 18, the magnetic sensor 10 and the 1st receiver 11.

This 1st receiver 11 is constituted by the 2nd amplifier 12 and the detector 13.

In the receiving side device 33, while transmitting a synchronizing signal to the transmitting side device 32 by radio, by the transmitting signal (alternating current for detection) passed from the transmitting side device 32 to the buried metal, the magnetic field generated in the buried metal is detecting by magnetic sensor 10 and is carrying out synchronous detection with the 1st receiver 11, and it is constituted so that the position of a buried metal and the direction of current of the transmitting signal transmitted to the buried metal may be detected.

In the transmitting side device 32, the synchronizing signal (f/m) which was transmitted by radio from the receiving side device 33, and received this on radio is converted into the transmitting signal (f/n), and, by transmitting this transmitting signal (f/n) to a buried metal with the 1st transmitter 34, it is constituted so that an alternating current may be passed through a buried metal.

The 1st transmitter 34 has a means for sending an alternating current through a buried metal like the 1st transmitter 4 of embodiment 1, and this means supports both direct method and induction method.

The multiplier 45 is using the synchronous oscillator using PLL (Phase Lock Loop) like the multiplier 15 of embodiment 1.

Moreover, the 1st divider 36, the 2nd divider 38, and the 3rd divider 46 are using the divider using DDS (Direct Digital Synthesizer) like the case of embodiment 1.

The 2nd transmitter 39 has a transmitting antenna and the 2nd receiver 44 has a receiving antenna.

The synchronizing signal (f/m) is transmitted to the 2nd receiver 44 on radio from the 2nd transmitter 39.

Next, function and operation at the time of detecting a buried metal using the detecting device 31 of a buried metal is explained in detail based on FIGS. 3-4.

In FIG. 4, the standard oscillator 5 generates a standard signal (f) as well as embodiment 1.

This standard signal (f) is carried out n divided by the 1st divider 36, subsequently, phase adjustment is carried out with phase adjustment machine 17, and it is converted into a reference signal (f/n), m divided is carried out by the 2nd divider 38, and it is converted into the synchronizing signal (f/m) transmitted to transmitting side device 32.

The synchronizing signal (f/m) is transmitted to the transmitting side device 32 by radio by the 2nd transmitter 39.

In this case, the frequency band which can transmit by radio has limitation like the case of embodiment 1.

Therefore, it is necessary to select suitably the standard signal (f) which generated with the standard oscillator 5 and the dividing ratio m of the 2nd divider 38 so that the frequency of a synchronizing signal (f/m) may also satisfy this limitation.

The synchronizing signal (f/m) transmitted to this transmitting side device 32 is received by the 2nd receiver 44, this signal is carried out m multiplied by the multiplier 45, and is converted into signal of the same frequency f as a standard signal (f).

This signal is further carried out n dividing by the 3rd divider 46, and is converted into a transmitting signal (f/n).

This transmitting signal (f/n) is amplified by the 1st amplifier 37, and is transmitted to a buried metal by the direct method or the induction method.

The magnetic field guided to a buried metal by the transmitting signal (f/n) transmitted to this buried metal is detected by the magnetic sensor 10.

After the magnetic field detected by magnetic sensor 10 removed I/V conversion and an unnecessary frequency component like the case of Embodiment 1 and being amplified by the 2nd amplifier 12, this signal is inputted into the detector 13 and synchronous detection is carried out in this detector 13 using a reference signal (f/n).

The magnetic field distribution which were generated in a buried metal, the depth of the buried metal and direction of the current of the transmitting signal (f/n) transmitted to the buried metal is calculated, and is outputted to display 18 by this synchronous detection.

The position and burial depth of a buried metal are detected based on magnetic field distribution of the magnetic field guided from the buried metal, the depth of a buried metal, and direction of current of the transmitting signal (f/n) transmitted to the buried metal etc.

The object (buried metal) detected by receiving side device 3 is able to distinguish whether it is a buried metal of target for detection, or it is the buried metal which is not target for detection and which carried out congestion.

As same as embodiment 1, if it sets up with (divides ratio n of the 1st divider 36, and the 3rd divider 46)<(divides ratio m of the 2nd divider 38), it is possible to acquire the reference signal (f/n) of the frequency more than the synchronizing signal (f/m) which has limitation in a frequency band.

Furthermore, if the dividing ratio n of the 1st divider 36 and the 3rd divider 46 is changed, it is possible to change easily the frequency of the transmitting signal (f/n) used for detection of a buried metal.

Moreover, although it is the same also in this embodiment and the above-mentioned embodiment 1, the dividing ratio n and the dividing ratio m may be changeable.

INDUSTRIAL APPLICABILITY

This invention not only can detect buried metals, such as many metal tubes, such as a water pipe currently buried in the ground, a gas pipe, and a drain pipe, or a telecommunication cable, and an electric power cable, but is broadly applicable to detection of the steel rod, steel frame, etc. of a building.

DESCRIPTION OF NOTATIONS

1, 31 Detecting device of a buried metal
2, 32 Transmitting side device
3, 33 Receiving side device
4, 9, 34 Transmitter
5 Standard Oscillator
6, 8, 16, 36, 38, 46 Divider
10 Magnetic Sensor
11, 14, 44 Receiver
15, 45 Multiplier
18 Display

The invention claimed is:

1. A method for detecting buried metal using synchronous detection method having a transmitting side device that transmits a transmitting signal (alternating current) to a buried metal for detection and transmits a synchronizing signal for synchronous detection, and a receiving side device for measuring the position and burial depth of said buried metal by detecting a magnetic field generated by said transmitting signal flowing in said buried metal with a magnetic sensor and processing amplitude and phase of said magnetic field, the method comprising:
   generating a standard signal of frequency f in said transmitting side device;
   n dividing this standard signal to convert it to a transmitting signal of frequency f/n;
   transmitting this transmitting signal to said buried metal;
   m dividing said standard signal to convert it to a synchronizing signal of frequency f/m;
   transmitting this synchronizing signal from said transmitting side device by radio;
   receiving said synchronizing signal by said receiving side device;
   m multiplying this received synchronizing signal to convert it to said standard signal;
   n dividing this converted standard signal to convert it to a reference signal of frequency f/n; and
   detecting a magnetic field generated by said transmitting signal flowing in said buried metal and synchronously detecting with said reference signal.

2. A device for detecting buried metal using synchronous detection method comprising a transmitting side device that transmits a transmitting signal (alternating current) to a buried metal for detection, and a receiving side device for measuring the position and burial depth of said buried metal by detecting a magnetic field generated by said transmitting signal flowing in said buried metal with a magnetic sensor and processing amplitude and phase of said magnetic field, the device comprising:
   said transmitting side device including a standard oscillator for generating a standard signal frequency f,
   a first divider for n-dividing said standard signal to convert it to a transmitting signal of frequency f/n,
   a second divider for m-dividing said standard signal to convert it to a synchronizing signal of frequency f/m,
   a first transmitter for transmitting the transmitting signal converted by said first divider to said buried metal and
   a second transmitter for transmitting the synchronizing signal converted by said second divider by radio; and
   said receiving side device including a receiver for receiving said synchronizing signal,
   a multiplier for m multiplying this synchronizing signal to convert it to said standard signal,
   a third divider for n-dividing this standard signal of frequency f to convert it to a reference signal of frequency f/n,
   a magnetic sensor for detecting a magnetic field generated by the transmitting signal flowing in said buried metal and
   device for synchronously detecting a signal detected by this magnetic sensor by said reference signal.

3. A method for detecting buried metal using synchronous detection method having a transmitting side device that transmits a transmitting signal (alternating current) to a buried metal for detection and transmits a synchronizing signal for synchronous detection, and a receiving side device for measuring the position and burial depth of said buried metal by detecting a magnetic field generated by said transmitting signal flowing in said buried metal with a magnetic sensor and processing amplitude and phase of said magnetic field, the method comprising:
   generating a standard signal of frequency f in said receiving side device;
   n dividing this standard signal to convert it to a reference signal of frequency f/n;
   m dividing said standard signal to convert it to a synchronizing signal of frequency f/m;
   transmitting this synchronizing signal from said receiving side device by radio;
   receiving said synchronizing signal by said transmitting side device;
   m multiplying this received synchronizing signal to convert it to said standard signal;
   n dividing this standard signal to convert it to a transmitting signal of frequency f/n;
   transmitting this transmitting signal to said buried metal; and
   detecting a magnetic field generated by said transmitting signal flowing in said buried metal and synchronously detecting with said reference signal.

4. A device for detecting buried metal using synchronous detection method comprising a transmitting side device that transmits a transmitting signal (alternating current) to a buried metal for detection, and a receiving side device for measuring the position and burial depth of said buried metal by detecting a magnetic field generated by said transmitting signal flowing in said buried metal with a magnetic sensor and processing amplitude and phase of said magnetic field:
   said receiving side device including a standard oscillator for generating a standard signal frequency f,
   a second divider for m-dividing this standard signal to convert it to a synchronizing signal of frequency f/m,
   a second transmitter for transmitting this synchronizing signal by radio,
   a first divider for n-dividing said standard signal to convert it to a reference signal of frequency f/n,
   a magnetic sensor for detecting a magnetic field generated by the transmitting signal flowing in said buried metal and
   a device for synchronously detecting a signal detected by this magnetic sensor by said reference signal; and
   said transmitting side device including a receiver for receiving said synchronizing signal,
   a multiplier for m multiplying this synchronizing signal to convert it to said standard signal,
   a third divider for n-dividing this standard signal of frequency f to convert it to a reference signal of frequency f/n and
   a first transmitter for transmitting the transmitting signal converted by said first divider to said buried metal.

* * * * *